United States Patent
Williams et al.

(10) Patent No.: US 11,599,651 B2
(45) Date of Patent: Mar. 7, 2023

(54) DATA PROTECTION

(71) Applicant: IRDETO B.V., Hoofddorp (NL)

(72) Inventors: Peter Williams, Ottawa (CA); Andrew Williams, Ottawa (CA); Colin Hutchings, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 348 days.

(21) Appl. No.: 16/623,424

(22) PCT Filed: Jul. 5, 2018

(86) PCT No.: PCT/EP2018/068292
§ 371 (c)(1),
(2) Date: Dec. 17, 2019

(87) PCT Pub. No.: WO2019/008112
PCT Pub. Date: Jan. 10, 2019

(65) Prior Publication Data
US 2020/0193040 A1 Jun. 18, 2020

(30) Foreign Application Priority Data
Jul. 5, 2017 (GB) ...................................... 1710839

(51) Int. Cl.
G06F 21/64 (2013.01)
G06F 21/62 (2013.01)
G06F 11/10 (2006.01)

(52) U.S. Cl.
CPC .......... *G06F 21/62* (2013.01); *G06F 11/1028* (2013.01); *G06F 11/1068* (2013.01); *G06F 21/64* (2013.01)

(58) Field of Classification Search
CPC ...... G06F 21/60; G06F 21/62; G06F 11/1028; G06F 11/1068; G06F 21/64; G06F 11/1012; G06F 11/1048
See application file for complete search history.

(56) References Cited

U.S. PATENT DOCUMENTS 5,283,791 A * 2/1994 Halford ................. G06F 3/0601
714/766
5,287,478 A * 2/1994 Johnston ............. G06F 11/1076
(Continued)

OTHER PUBLICATIONS

K. Namba and F. Lombardi, "Parallel Decodable Multi-Level Unequal Burst Error Correcting Codes for Memories of Approximate Systems," in IEEE Transactions on Computers, vol. 65, No. 12, pp. 3794-3801, Dec. 1, 2016, doi: 10.1109/TC.2016.2550449. (Year: 2016).*

(Continued)

*Primary Examiner* — Khalid M Almaghayreh
(74) *Attorney, Agent, or Firm* — Rimon PC; Marc S. Kaufman

(57) ABSTRACT

A computer-implemented method, in which an access request in relation to data is received. There is Error Correcting Code (ECC) data relating to the data, and the ECC data is configured to enable correction of multiple-bit errors spanning up to a predetermined number of consecutive bits of the data. The ECC data is configured to enable correction of multiple-bit errors spanning up to a predetermined number of consecutive bits of the data. A first integrity verification verifies the integrity of at least the data. If the first integrity verification procedure fails, an error analysis procedure is performed based on the data and the ECC data. Responsive to generation of corrected data by the error analysis procedure, a second integrity verification verifies the integrity of the corrected data. If the second integrity verification is successful, the access request is allowed using the corrected data.

16 Claims, 9 Drawing Sheets

(56) References Cited

U.S. PATENT DOCUMENTS

| | | | | |
|---|---|---|---|---|
| 6,367,046 B1* | 4/2002 | Chapman | G06F 11/1008 | 714/752 |
| 8,464,093 B1* | 6/2013 | Swenson | G06F 11/108 | 714/755 |
| 8,495,458 B1* | 7/2013 | Song | G06F 11/1012 | 714/759 |
| 9,110,827 B2* | 8/2015 | Sakai | H03M 13/6306 | |
| 9,183,078 B1* | 11/2015 | Zhu | G06F 11/10 | |
| 2003/0046632 A1* | 3/2003 | Hatakenaka | G06F 11/1012 | 714/763 |
| 2005/0172207 A1* | 8/2005 | Radke | G06F 11/1008 | 714/763 |
| 2006/0064622 A1* | 3/2006 | Fisher | H04L 9/40 | 714/758 |
| 2007/0136636 A1* | 6/2007 | Tsai | H03M 13/2906 | 714/752 |
| 2009/0019321 A1* | 1/2009 | Radke | G06F 11/1072 | 714/E11.002 |
| 2010/0050054 A1* | 2/2010 | Abraham | H04L 1/0072 | 714/776 |
| 2011/0307758 A1* | 12/2011 | Fillingim | G06F 11/1048 | 714/E11.03 |
| 2013/0061115 A1* | 3/2013 | Imai | H03M 13/09 | 714/763 |
| 2013/0179751 A1* | 7/2013 | Linstadt | G06F 11/10 | 714/763 |
| 2014/0201597 A1* | 7/2014 | Hoekstra | G06F 11/10 | 714/764 |
| 2015/0100852 A1* | 4/2015 | Huang | G06F 11/1052 | 714/773 |
| 2015/0143201 A1* | 5/2015 | Coteus | G06F 11/1008 | 714/773 |
| 2015/0318871 A1* | 11/2015 | Hoekstra | H03M 13/35 | 714/763 |
| 2015/0339319 A1 | 11/2015 | Malina | | |
| 2015/0370636 A1* | 12/2015 | Sole | H03M 13/17 | 714/764 |
| 2016/0004592 A1* | 1/2016 | Suzuki | H03M 13/09 | 714/807 |
| 2016/0124846 A1* | 5/2016 | Li | G06F 12/0246 | 711/103 |
| 2016/0246670 A1* | 8/2016 | Mateescu | H03M 13/1105 | |
| 2016/0380651 A1* | 12/2016 | Hughes, Jr. | H03M 13/19 | 714/755 |
| 2017/0091445 A1 | 3/2017 | Xing et al. | | |
| 2018/0060163 A1* | 3/2018 | Jalan | G06F 11/1012 | |

OTHER PUBLICATIONS

Z. Jianwu, S. Yibing and Li Yanjun, "Software Implementation of a Novel Approach to Improving Burst Errors Correction Capability of Hamming Code," 2007 8th International Conference on Electronic Measurement and Instruments, 2007, pp. 2-499-2-503, doi: 10.1109/ICEMI.2007.4350726. (Year: 2007).*

GB1710839.0 Combined Search and Examination Report under Sections 17 and 18(3) dated Dec. 21, 2017.

* cited by examiner

|   |   |   |   |   |   |   |   |                      |
|---|---|---|---|---|---|---|---|----------------------|
| 1 | 1 | 1 | 1 | 1 | 1 | 1 | 1 | Hamming Parity Byte #1 |
| 2 | 2 | 2 | 2 | 2 | 2 | 2 | 2 | Hamming Parity Byte #2 |
| 3 | 3 | 3 | 3 | 3 | 3 | 3 | 3 | Data Byte #1 |
| 4 | 4 | 4 | 4 | 4 | 4 | 4 | 4 | Hamming Parity Byte #3 |
| 5 | 5 | 5 | 5 | 5 | 5 | 5 | 5 | Data Byte #2 |
| 6 | 6 | 6 | 6 | 6 | 6 | 6 | 6 | Data Byte #3 |
| 7 | 7 | 7 | 7 | 7 | 7 | 7 | 7 | |
| 8 | 8 | 8 | 8 | 8 | 8 | 8 | 8 | Hamming Parity Byte #4 |
| 9 | 9 | 9 | 9 | 9 | 9 | 9 | 9 | |
| 10 | 10 | 10 | 10 | 10 | 10 | 10 | 10 | |
| 11 | 11 | 11 | 11 | 11 | 11 | 11 | 11 | |
| 12 | 12 | 12 | 12 | 12 | 12 | 12 | 12 | |
| 13 | 13 | 13 | 13 | 13 | 13 | 13 | 13 | |
| 14 | 14 | 14 | 14 | 14 | 14 | 14 | 14 | |
| 15 | 15 | 15 | 15 | 15 | 15 | 15 | 15 | Data Byte #11 |
| 16 | 16 | 16 | 16 | 16 | 16 | 16 | 16 | Hamming Parity Byte #5 |

FIGURE 4

|   |   |   |   |   |   |   |   |                      |
|---|---|---|---|---|---|---|---|----------------------|
| 3 | 3 | 3 | 3 | 3 | 3 | 3 | 3 | Data Byte #1 |
| 5 | 5 | 5 | 5 | 5 | 5 | 5 | 5 | Data Byte #2 |
| 6 | 6 | 6 | 6 | 6 | 6 | 6 | 6 | Data Byte #3 |
| 7 | 7 | 7 | 7 | 7 | 7 | 7 | 7 | |
| 9 | 9 | 9 | 9 | 9 | 9 | 9 | 9 | |
| 10 | 10 | 10 | 10 | 10 | 10 | 10 | 10 | |
| 11 | 11 | 11 | 11 | 11 | 11 | 11 | 11 | |
| 12 | 12 | 12 | 12 | 12 | 12 | 12 | 12 | |
| 13 | 13 | 13 | 13 | 13 | 13 | 13 | 13 | |
| 14 | 14 | 14 | 14 | 14 | 14 | 14 | 14 | |
| 15 | 15 | 15 | 15 | 15 | 15 | 15 | 15 | Data Byte #11 |
| 1 | 1 | 1 | 1 | 1 | 1 | 1 | 1 | Hamming Parity Byte #1 |
| 2 | 2 | 2 | 2 | 2 | 2 | 2 | 2 | Hamming Parity Byte #2 |
| 4 | 4 | 4 | 4 | 4 | 4 | 4 | 4 | Hamming Parity Byte #3 |
| 8 | 8 | 8 | 8 | 8 | 8 | 8 | 8 | Hamming Parity Byte #4 |
| 16 | 16 | 16 | 16 | 16 | 16 | 16 | 16 | Hamming Parity Byte #5 |

601 — Data bits $b_1 \ldots b_B$

602 — ECC bits $e_1 \ldots e_E$

| Data Byte 1 | Data Byte 2 | Data Byte 3 | Data Byte 4 |
|---|---|---|---|
| Data Byte 5 | Data Byte 6 | Data Byte 7 | Data Byte 8 |
| Data Byte 9 | Data Byte 10 | Data Byte 11 | Data Byte 12 |
| Data Byte 13 | Data Byte 14 | Data Byte 15 | Data Byte 16 |
| Data Byte 17 | Data Byte 18 | Data Byte 19 | Data Byte 20 |
| Data Byte 21 | Data Byte 22 | Data Byte 23 | Data Byte 24 |
| Data Byte 25 | Data Byte 26 | Data Byte 27 | Data Byte 28 |
| Data Byte 29 | Data Byte 30 | Data Byte 31 | Data Byte 32 |
| Data Byte 33 | Data Byte 34 | Data Byte 35 | Data Byte 36 |
| Data Byte 37 | Data Byte 38 | Data Byte 39 | Data Byte 40 |
| Data Byte 41 | Data Byte 42 | Data Byte 43 | Data Byte 44 |
| Data Byte 45 | Data Byte 46 | Data Byte 47 | Data Byte 48 |
| Data Byte 49 | Data Byte 50 | Data Byte 51 | Data Byte 52 |
| Data Byte 53 | Data Byte 54 | Data Byte 55 | Data Byte 56 |
| Data Byte 57 | Data Byte 58 | Data Byte 59 | Data Byte 60 |
| Data Byte 61 | Data Byte 62 | Data Byte 63 | Data Byte 64 |
| Data Byte 65 | Data Byte 66 | Data Byte 67 | Data Byte 68 |
| Data Byte 69 | Data Byte 70 | Data Byte 71 | Data Byte 72 |
| Data Byte 73 | Data Byte 74 | Data Byte 75 | Data Byte 76 |
| Data Byte 77 | Data Byte 78 | Data Byte 79 | Data Byte 80 |
| Data Byte 81 | Data Byte 82 | Data Byte 83 | Data Byte 84 |
| Data Byte 85 | Data Byte 86 | Data Byte 87 | Data Byte 88 |

| ECC Byte 1 | ECC Byte 2 | ECC Byte 3 | ECC Byte 4 |
|---|---|---|---|
| ECC Byte 5 | ECC Byte 6 | ECC Byte 7 | ECC Byte 8 |
| ECC Byte 9 | ECC Byte 10 | ECC Byte 11 | ECC Byte 12 |
| ECC Byte 13 | ECC Byte 14 | ECC Byte 15 | ECC Byte 16 |
| ECC Byte 17 | ECC Byte 18 | ECC Byte 19 | ECC Byte 20 |
| ECC Byte 21 | ECC Byte 22 | ECC Byte 23 | ECC Byte 24 |
| ECC Byte 25 | ECC Byte 26 | ECC Byte 27 | ECC Byte 28 |
| ECC Byte 29 | ECC Byte 30 | ECC Byte 31 | ECC Byte 32 |

FIGURE 6B

| Span S (in bytes) | Level L (in bits) | Data Length N (in bits) | Data Size D (in bytes) | Repair Size R (in bytes) | Overhead O |
|---|---|---|---|---|---|
| 4 | 4 | 11 | 44 | 16 | 36% |
| 8 | 5 | 26 | 208 | 40 | 19% |
| 12 | 6 | 57 | 684 | 72 | 11% |
| 16 | 7 | 120 | 1920 | 112 | 6% |
| 16 | 8 | 247 | 3952 | 128 | 3% |

DATA PROTECTION

FIELD OF THE INVENTION

The present invention relates to data protection. In particular, the present invention relates to methods for dynamic data correction in instances where data has been modified or corrupted. Associated apparatuses, computer programs, and computer-readable media are also envisaged.

BACKGROUND OF THE INVENTION

Data verification uses an algorithm for verifying the integrity of computer data. One approach is to compare the data with another stored copy of the same data bit-by-bit. Clearly, two copies of the same data are required, and this approach may miss systematic corruptions which might occur to both sets of data. Another more popular approach is to store checksums (hashes) of data, also known as message digests, for later comparison. If the hash value of a current version of the data does not match the previously stored hash value, then the data integrity has been compromised and the data has been corrupted. Data can become corrupted by faulty storage media, errors in transmission, write errors during copying or moving, software bugs, malicious attacks, and so on. Alternatively, if the hash values match, the data is presumed to be unmodified. For increased security, cryptographic hash functions may be used. Alternatively, digital signatures can be employed to assure tamper resistance.

With regard to malicious attacks, data verification can provide an indication that computer data has been tampered with, and thereby prevent further access to that data as a result. However, it would be desirable to improve the ability of a computer system to respond to attackers' attempts to tamper with computer data.

SUMMARY OF THE INVENTION

According to a first aspect of the present invention, there is provided a computer-implemented method comprising: (a) receiving an access request in relation to data, wherein there exists error-correcting code (ECC) data relating to the data; (b) performing a first integrity verification (IV) procedure to verify the integrity of at least the data; (c) responsive to a finding of non-integrity by the first IV procedure, performing an error analysis procedure based on the data and the ECC data; (d) responsive to generation of corrected data by the error analysis procedure, performing a second IV procedure to verify the integrity of at least the corrected data; and (e) responsive to a finding of integrity by the second IV procedure, allowing the access request using the corrected data.

The method of the first aspect provides for dynamic correction of data, thereby allowing data to recover from tampering. No external access to replacement data is required. The method can be run every time that there is an access request relating to the data (e.g. every time a data file is read from a storage medium).

According to a second aspect of the present invention, there is provided a computer-implemented method of securing data, the method comprising performing a series of checks, wherein performing a check comprises: (a) performing a first IV procedure to verify the integrity of at least the data; (b) responsive to a finding of non-integrity by the first IV procedure, performing an error analysis procedure based on the data and ECC data relating to the data; (c) responsive to generation of corrected data by the error analysis procedure, performing a second IV procedure to verify the integrity of at least the corrected data; and (d) responsive to a finding of integrity by the second IV procedure, updating the data using the corrected data.

According to a third aspect of the present invention, there is provided a method of executing, using one or more processors, a computer program stored on a storage medium. The method comprises loading into code space at least part of the computer program stored on the storage medium, and the method further comprises executing one or more instructions of the loaded at least part of the computer program. Execution of said one or more instructions causes the one or more processors to: (a) perform a first IV procedure to verify the integrity of the loaded at least part of the computer program; (b) responsive to a finding of non-integrity by the first IV procedure, perform an error analysis procedure based on the loaded at least part of the computer program and corresponding ECC data; (c) responsive to generation of corrected data by the error analysis procedure, perform a second IV procedure to verify the integrity of at least the corrected data; (d) responsive to a finding of integrity by the second IV procedure, cause execution of the computer program to terminate.

According to a fourth aspect of the present invention, there is provided a method of executing, using one or more processors, a computer program stored on a storage medium. The method comprises loading into code space at least part of the computer program stored on the storage medium, and the method further comprises executing one or more instructions of the loaded at least part of the computer program. Execution of said one or more instructions causes the one or more processors to: (a) perform a first IV procedure to verify the integrity of the computer program stored on the storage medium; (b) responsive to a finding of non-integrity by the first IV procedure, perform an error analysis procedure based on the computer program stored on the storage medium and corresponding ECC data; (c) responsive to generation of corrected data by the error analysis procedure, perform a second IV procedure to verify the integrity of at least the corrected data; (d) responsive to a finding of integrity by the second IV procedure, update the computer program stored on the storage medium using the corrected data; and (e) cause execution of the computer program to terminate.

According to a fifth aspect of the present invention, there is provided an apparatus arranged to carry out the method according to any one of the first to fourth aspects.

According to a sixth aspect of the present invention, there is provided a computer program which, when executed by one or more processors, causes the one or more processors to carry out a method according to any one of the first to fourth aspects.

According to a seventh aspect of the present invention, there is provided a computer-readable medium storing a computer program according to the sixth aspect.

Other preferred features of the present invention are set out in the appended claims.

BRIEF DESCRIPTION OF THE DRAWINGS

Embodiments of the present invention will now be described by way of example with reference to the accompanying drawings in which:

FIG. 4 schematically illustrates byte-wise insertion of Hamming parity bytes into data.

FIG. 5 schematically illustrates a re-ordering of the data bytes and the Hamming parity bytes of FIG. 4.

FIG. 6A schematically illustrates an arrangement of data bits 1-704 of a data chunk and the corresponding arrangement of Hamming parity bytes 1-256 for that data chunk.

FIG. 6B schematically illustrates the arrangement of the data bits and Hamming parity bits of FIG. 6A into bytes.

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
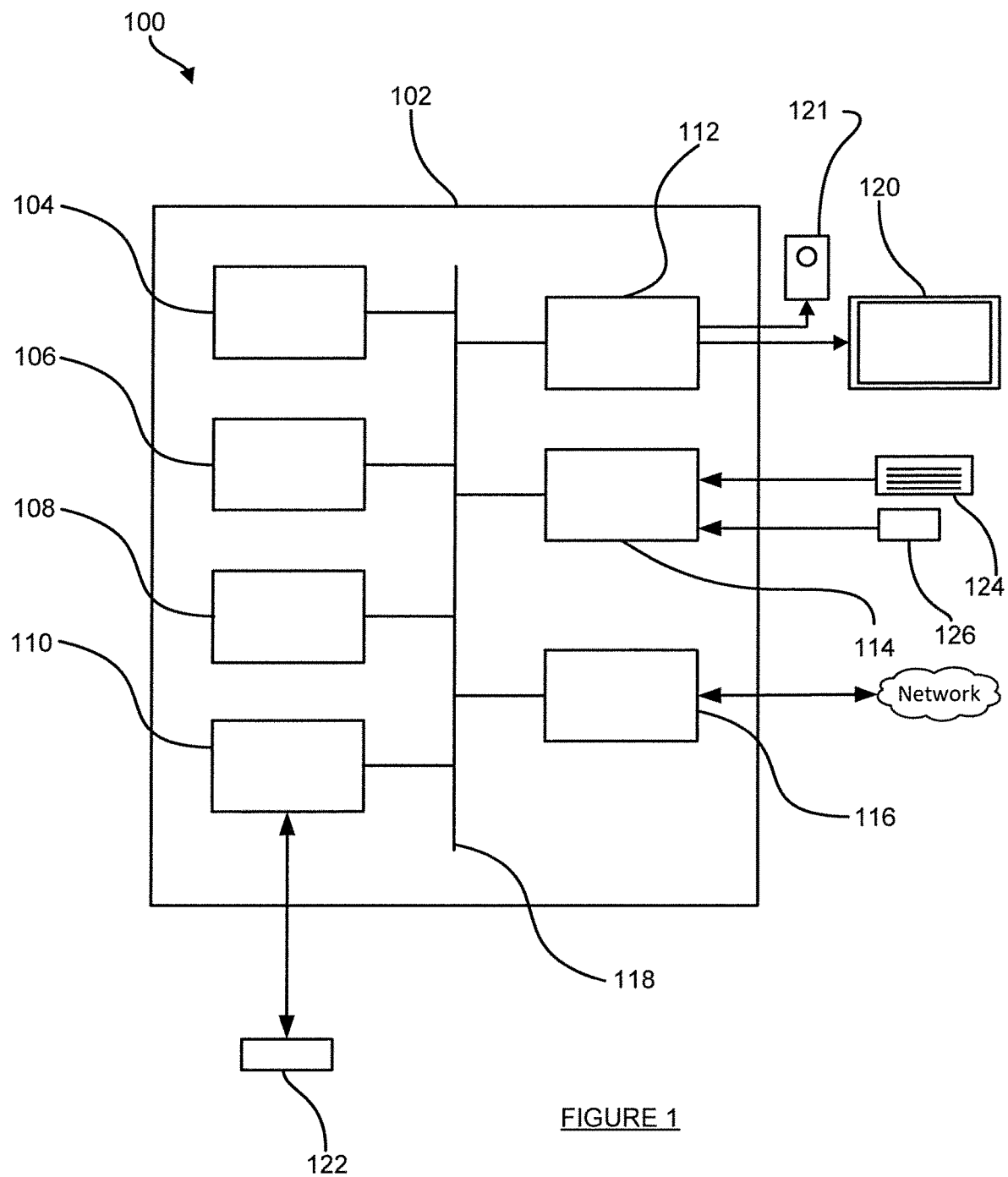
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

2—Self-Repairing Data

Figure 2:
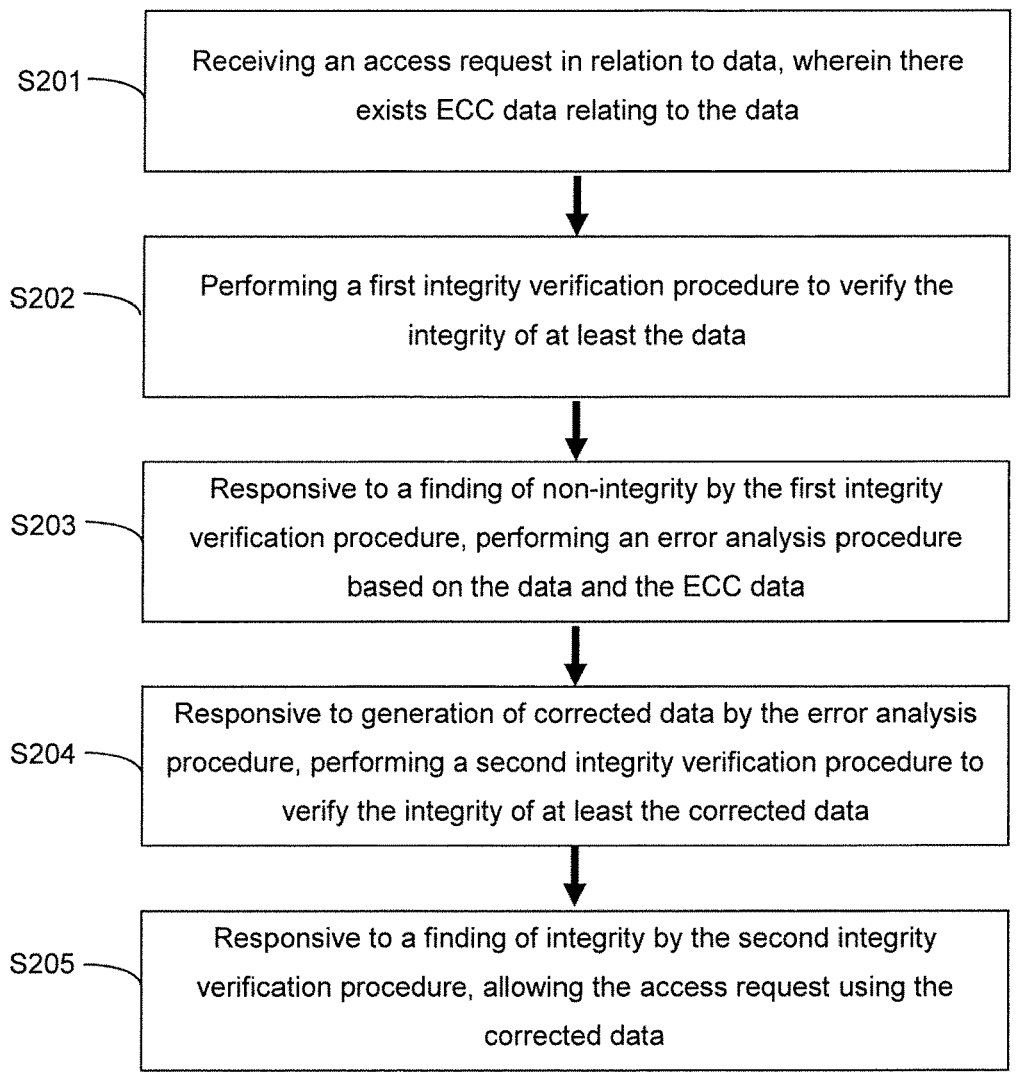
FIG. 2 schematically illustrates a computer-implemented method according to one embodiment.

A general computer-implemented method 200 is schematically illustrated in FIG. 2. Step S201 comprises receiving an access request in relation to data. There exists ECC data relating to the data. Step S202 comprises performing a first IV procedure to verify the integrity of at least the data. Step S203 comprises, responsive to a finding of non-integrity by the first IV procedure, performing an error analysis procedure based on the data and the ECC data. Step S204 comprises, responsive to generation of corrected data by the error analysis procedure, performing a second IV procedure to verify the integrity of at least the corrected data. Then, step S205 comprises, responsive to a finding of integrity by the second IV procedure, allowing the access request using the corrected data.

Thus, an IV procedure is first used to assess whether the data is corrupted. It will be understood that there are many well-known IV procedures which could be used for this purpose. If the data is found to be corrupted, then related ECC data may be used to attempt to correct any errors in the data. It will be understood that there are many well-known ECC encoding and decoding algorithms which could be used to generate the ECC data, and to subsequently detect and correct errors based on that ECC data. The same (or a different) IV procedure may then be used on the corrected data to check whether the corrections applied by the error analysis procedure have been successful. If so, the access request is allowed using the corrected data.

Since the error correction is only attempted after modification of the data has been detected by an IV procedure, the computational overhead is relatively low. One reason for this is that running the IV procedures usually has a lower computational overhead than the ECC-based error analysis procedures (the IV procedures are not ECC-based procedures). This reduced computation overhead of the IV procedures is particularly relevant when the ECC-based error analysis procedures are detecting and correcting burst errors comprising multiple consecutive bits. Thus, there is only an impact on performance when a modification to the data has already been detected, and a reduction in performance in such situations is usually acceptable (i.e. users tend to be happy to accept reduced performance if a malicious attack is being countered).

The data may be a file on a non-volatile data storage medium such as a magnetic disc, solid state storage, or the like. Alternatively, the data may be stored in volatile memory, such as RAM.

For simplicity, the second IV procedure may be the same as the first IV procedure, and this is generally a preferred embodiment. However, different IV procedures may be used for verifying the data and the corrected data in particular implementations if desired.

Notably, when an attacker adds debug points or makes other modifications to data, errors spanning multiple bytes of data are often introduced. In some embodiments, the data comprises executable code (e.g. a binary executable, source code, etc.). The method 200 is particularly useful against attackers who are replacing/modifying instruction blocks in an executable data file in this way since the method 200 can be configured to protect against large errors which span up to a given number of bits/bytes. In particular, the ECC data is configured to enable correction of multiple-bit errors spanning up to a predetermined number of consecutive bits of the data (i.e. burst errors), as will be described below.

Exemplary implementations of this methodology will be discussed in more detail below with reference to Hamming codes being used in the ECC encoding and decoding algorithms. Hamming codes are well known; related algorithms for ECC encoding (i.e. generating the Hamming ECC data) and decoding (subsequent detection and correction of errors based on the Hamming ECC data) are also well known (e.g. see en.wikipedia.org/wiki/Hammingcode).

The ECC data (or repair data) of a standard Hamming code comprises parity bits (or check bits) inserted into a data stream to either detect up to two-bit errors or correct one-bit error.

Figure 3:
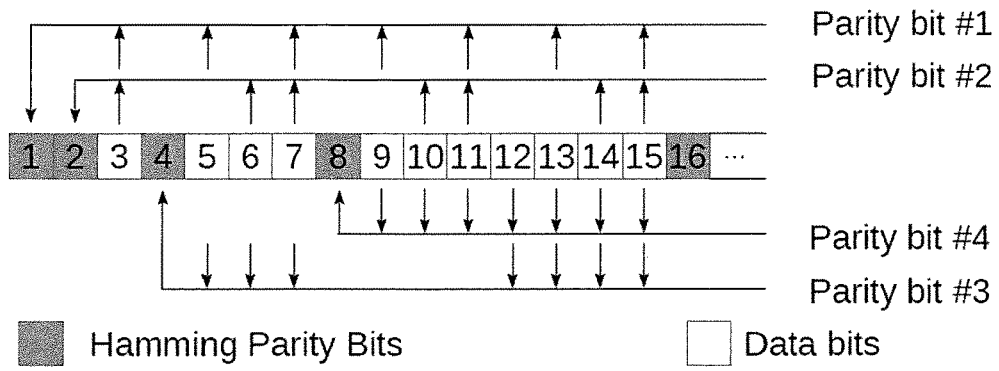
FIG. 3 schematically illustrates bit-wise insertion of Hamming parity bits into data.

As example of a Hamming parity stream is schematically illustrated in FIG. 3 in which bits 1, 2, 4, 8 and 16 are Hamming parity bits #1, #2, #3, #4 and #5 respectively, and bits 3, 5-7 and 9-15 are data bits of the relevant data stream/file to be protected. The parity bits indicate whether the number of 1s of the bits they cover is odd or even, and may be implemented computationally efficiently by means of XOR operations. The most common convention is that a parity value of 1 indicates that there is an odd number of 1s in the data, and a parity value of 0 indicates that there is an even number of 1s. Parity bit #1 covers all bit positions that have the least significant bit set as a 1 (i.e. bits 1, 3, 5, 7, 9, 11, 13, 15, etc.). Parity bit #2 covers all bit positions that have the second least significant bit set as a 1 (i.e. bits 2, 3, 6, 7, 10, 11, 14, 15, etc.). Parity bit #3 covers all bit positions that have the third least significant bit set as a 1 (i.e. bits 4-7, 12-15, etc.). Parity bit #4 covers all bit positions that have the fourth least significant bit set as a 1 (i.e. bits 8-15, etc.). Parity bit #5 covers bit positions that are not shown in this example, so is redundant here. The parity bits can be calculated by means of an Hamming ECC encoding algorithm. Notably the parity bits (i.e. the ECC data) are themselves part of the repairable data.

It is possible to change how we look as this data, as schematically illustrated in FIG. 4 where the columns represent 8 Hamming parity streams (e.g. similar to the Hamming parity stream shown in FIG. 3). All of the bits in each data byte are in different Hamming parity streams. Thus, we can now repair an error block of size 1 byte (8 bits) and optionally detect an error block of size 2 bytes (16 bits).

Nonetheless, in the example of FIG. 4, the Hamming parity bits (i.e. the ECC data) are 'in band' meaning they are inserted directly into the source data. This means that it would be necessary to 'filter out' the Hamming data when reading the data. It also adds a layer of complexity in terms of creation/insertion of the ECC data. Therefore, as schematically illustrated in FIG. 5, we may change our viewpoint again. In this example, the same data bytes and Hamming parity bytes are shown as in FIG. 4, but they have been re-ordered such that the original data bytes are listed first and the Hamming parity bytes are listed last. This means that the original data has been left unaltered and the related ECC data may be stored in any location (e.g. with the original data or elsewhere).

Furthermore, we are not limited to error block repairs of up to only 1 byte; the 'width' (i.e. the number of columns) of the data can be adjusted as desired. The width may be any number of bits, but is preferably an integer number of bytes to enable efficient processing, so we will refer to widths in bytes in the examples below, but it will be understood that this is optional. This width (in bytes) may be referred to as the 'span' of the repair data. The span represents the longest run of damaged bytes that can be guaranteed to be successfully repaired. Twice the span represents the longest run of damaged bytes that is guaranteed to be successfully detected. Thus, the present methodology envisages a configurable span of continuous bit (or byte) errors for repair. In particular, it can be used to correct a multiple-bit error, i.e. an error spanning at least 2 consecutive bits of data (e.g. a 2-bit error, or a consecutive 3-bit error, or a consecutive 8-bit error (i.e. a byte error), or more).

Figure 6A:
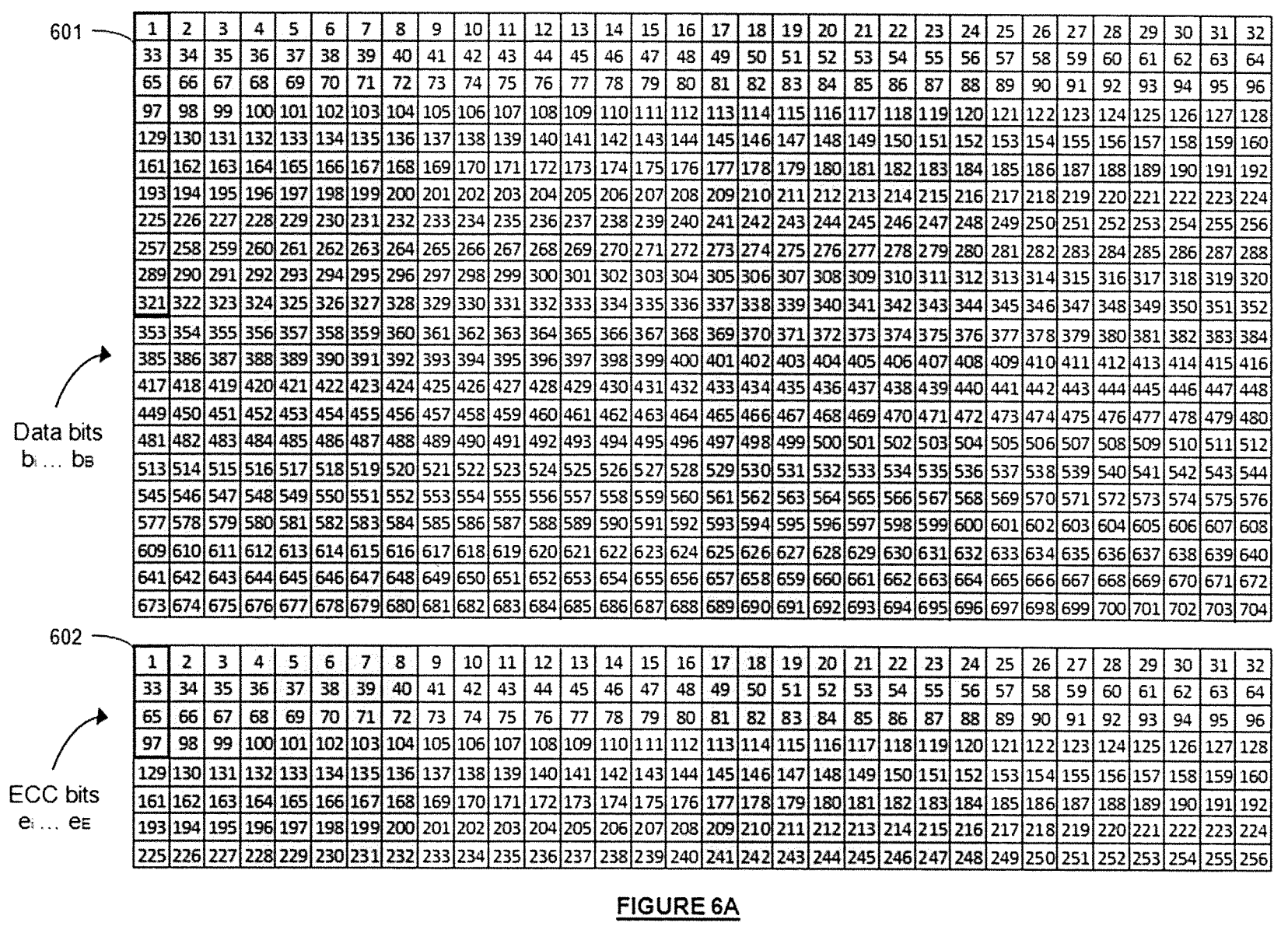

Consider a chunk of data, such as a file of executable software code, comprising a sequence of B bits $b_i$ (i=1, ... B). Such a file having B=704 bits of data is schematically illustrated in FIG. 6A. In this illustrative example, the span S of the data chunk (in bytes) is 4. The width T of the data chunk in bits (i.e. the number of columns of data) may be calculated as T=8S=32. ECC/repair data bits $e_i$ (i=1, ... E) may be generated using a Hamming ECC encoding algorithm as referenced above. In the example given above, up to 11 data bits of the data chunk are protected by 4 Hamming parity bits. In other words, the data length N (in bits) is 11, and the 'level' L (i.e. the number of parity bits) is 4. As an example, the 11 data bits highlighted by a thick border 601 in FIG. 6A are used as the data chunk input to the ECC encoding algorithm to generate the 4 repair bits also highlighted by a thick border 602 in FIG. 6A.

More generally, an input sequence of data bits of the data chunk for the ECC encoding algorithm in this example is:

$$b_i, b_{(i+T)}, b_{(i+2T)}, \ldots, b_{(i+(N-1)T)}$$

where (i=1, 2, . . . , T,
 NT+1, NT+2, . . . , NT+T,
 2NT+1, 2NT+2, . . . , 2NT+T
 3NT+1, 2NT+2, . . . , 3NT+T, From an ECC perspective, this input sequence of data bits generates the following repair bits:

$$e_i, e_{(i+T)}, e_{(i+2T)}, \ldots, e_{(i+(L-1)T)}$$

The overhead in terms of additional data storage is inversely dependent on the number of Hamming bits utilized. The more Hamming bits, the lower the overhead. In the example given, up to 11 data bits are protected by 4 Hamming bits, an overhead of 4/11=36%. We refer to this as an 11/4 Hamming code (i.e. N=11 and L=4).

Of course, if it is desired to use an 11/4 Hamming code with a span of 4 bytes (as shown in FIG. 6A, and the data chunk is not an exact multiple of 11×32, then an additional sequence of padding bits (or stuff bits) could be appended to the data chunk. The padding bits may simply be a sequence of zeros. For example, with reference to FIG. 6A, if the data chunk were actually of size 628, then a sequence of 76 zeros could be appended in bit positions 629-704 to pad the data out to be the size shown in FIG. 6A.

Notably, the individual data bits of the data chunk and repair data shown in FIG. 6A may alternatively be viewed as data bytes, as schematically illustrated in FIG. 6B. Since the repair data (i.e. the ECC data) may be generated by means of XOR processing, it is not necessary to perform this processing on a bit-by-bit basis, but instead whole data bytes (or multiple data bytes at once) may the subject of the same XOR processing to generate the related ECC data bytes. This increases the efficiency of the processing necessary to generate the ECC data using the Hamming ECC encoding algorithm. Similarly, multiple data bytes may be processed all at once during the subsequent ECC decoding stage where the ECC data is used to check for and potentially repair any errors.

Figures 7, 8:
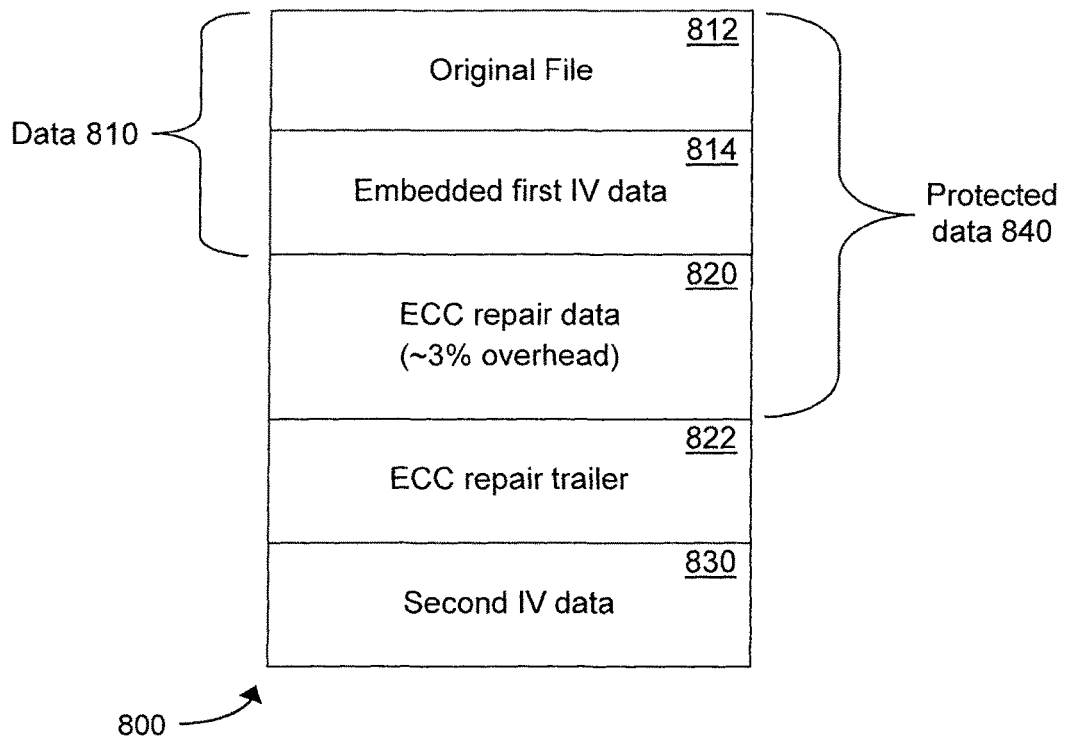
FIG. 7 is a table showing exemplary Hamming code settings.
FIG. 8 schematically illustrates an example data structure for use in the present method.

Examples of possible Hamming code settings are shown in FIG. 7. As previously mentioned, the span S (in bytes) is the highest run of damaged bytes that can be guaranteed to be successfully repaired. The level L (in bits) is the number of repair bits per Hamming parity stream. Relatedly, the data length N (in bits) is given by N+L=$2^L$-1 such that N=$2^L$-1-L. The data length N is the number of data bits of the data chunk that are protected by a level L of Hamming parity bits. The data size D (in bytes) is given by D=SN. The repair size R (in bytes) is the amount of repair data (i.e. the number of repair bits required for a data size D). It follows that R=SL. The overhead O is defined as O=R/D=SL/SN=L/N. Thus, FIG. 7 shows that the overhead O goes down as the number of Hamming bits L goes up.

Most modern machine architectures have machine word length of 64 bits (or 8 bytes). In such machines, the best Hamming code performance occurs when the span S is a multiple of 8. In other words, 64-bit machines work best with a span of 64, 128, 192, etc. Similarly, 32 bit machines work best with a span of 32, 64, 96, 128, etc. Thus, for a given machine architecture, the best performance occurs when the span (in bytes) is a multiple of the machine word length (in bytes). In a preferred implementation, we use a Hamming algorithm with a span S of 16 and a level L of 8—we will refer to this as a 16/8 Hamming Repair Tool (HRT) algorithm. In this implementation, error lengths of 16 bytes can be repaired in each 3952 byte data block of the original data chunk, and there is an overhead of only 3%.

In one implementation, the repair bits are stored with the original data chunk by appending the repair bits to the data chunk. Thus, the data chunk and the repair data may be stored in the same file, and all of the data chunk and the repair data are protected by the repair data (since the parity bits cover a range of bits including the parity bits themselves). This means that, at the time of the creation of the repair data, all of the data in the file is protected. An advantage of storing the ECC/repair data in the same file as the original data chunk is that the ECC data is verified together with the data chunk during the IV steps. However, it will be appreciated that the repair bits may instead be stored separately from the data chunk if desired.

An example data structure 800 for use in connection with the present method is shown in FIG. 8. The data structure 800 comprises an original file 812, embedded first IV data 814, ECC repair data 820, an ECC repair trailer 822, and second IV data 830.

In this exemplary data structure 800, the data 810 is made up of an original file 812 with appended first IV data 814. Thus, the first IV data 814 is embedded in the data 810 in this example. The original file 812 may be executable software code such that the data 810 comprises executable software code. The first IV data 814 may be any type of IV data to verify the integrity of the data 810, such as a hash or checksum value, or a digital signature, or a message authentication code, for example. Other known types of IV data may also be used. The IV data is not ECC-based data.

The original file 812 and the embedded first IV data 814 together make up the input data 810 for the ECC encoding algorithm. The generated ECC repair data 820 (i.e. ECC data), is stored with the data 810 in FIG. 8. In fact, the ECC repair data 820 is appended to the data 810. Thus, in the embodiment of FIG. 8, the data referred to in the method of FIG. 2 comprises the data 810 (i.e. the original file 812 with the embedded first IV data 814). The ECC data referred to in the method of FIG. 2 comprises the ECC repair data 820. Thus, both the data 810 and the ECC repair data 820 are protected by the ECC repair data 820. Hence, the data 810 and the ECC repair data 820 may together be referred to as the protected data 840.

Appended to the ECC repair data 820 in FIG. 8 is an optional ECC repair trailer 822. The ECC repair trailer 822 may include data to specify the nature of the ECC algorithm being used (e.g. span, level, etc.). The ECC repair trailer 822 may further include data to help identify the location of the ECC repair data 820 (e.g. an offset in the data file or a URL to where the ECC repair data 820 is stored). Since the ECC repair data 820 does not cover data in the ECC repair trailer 822, the ECC repair trailer 822 may further include additional ECC repair data relating to the ECC repair trailer data itself. The additional ECC repair data may be generated by running a second ECC encoding algorithm on data in the ECC repair trailer 822. In other words, the additional ECC repair data is generated from data in the ECC repair trailer 822 so as to provide error correction capabilities in connection with the data in the ECC repair trailer 822. For example, the additional ECC repair data may use a 4/3 HRT algorithm (i.e. S=4, L=3), which means that any damage spanning up to 4 bytes in the data in the ECC repair trailer 822 may be corrected.

Second IV data 830 may optionally be provided as part of the data structure 800. The second IV data 830 may be any type of IV data to verify the integrity of the rest of the data structure (i.e. the protected data 840 together with the optional ECC repair trailer 822). For example, the second IV data 830 may be as a hash or checksum value, or a digital signature, or a message authentication code, for example. Other known types of IV data may also be used. In one implementation, the second IV data 830 is a kernel IV signature which acts as the outer signature for the data structure 800.

Notably IV procedures involving the first IV data 814 may be preferred since they relate to testing the integrity of a smaller amount of data than IV procedures involving the second IV data 830. Thus, IV procedures involving the first IV data 814 would generally be quicker. Also, it is preferable to perform IV procedures on only the data that is necessary to be verified (i.e. the original file 812). This ensures that any finding of non-integrity will relate to the original file 812 rather than to other (potentially superfluous) data.

Figure 9:
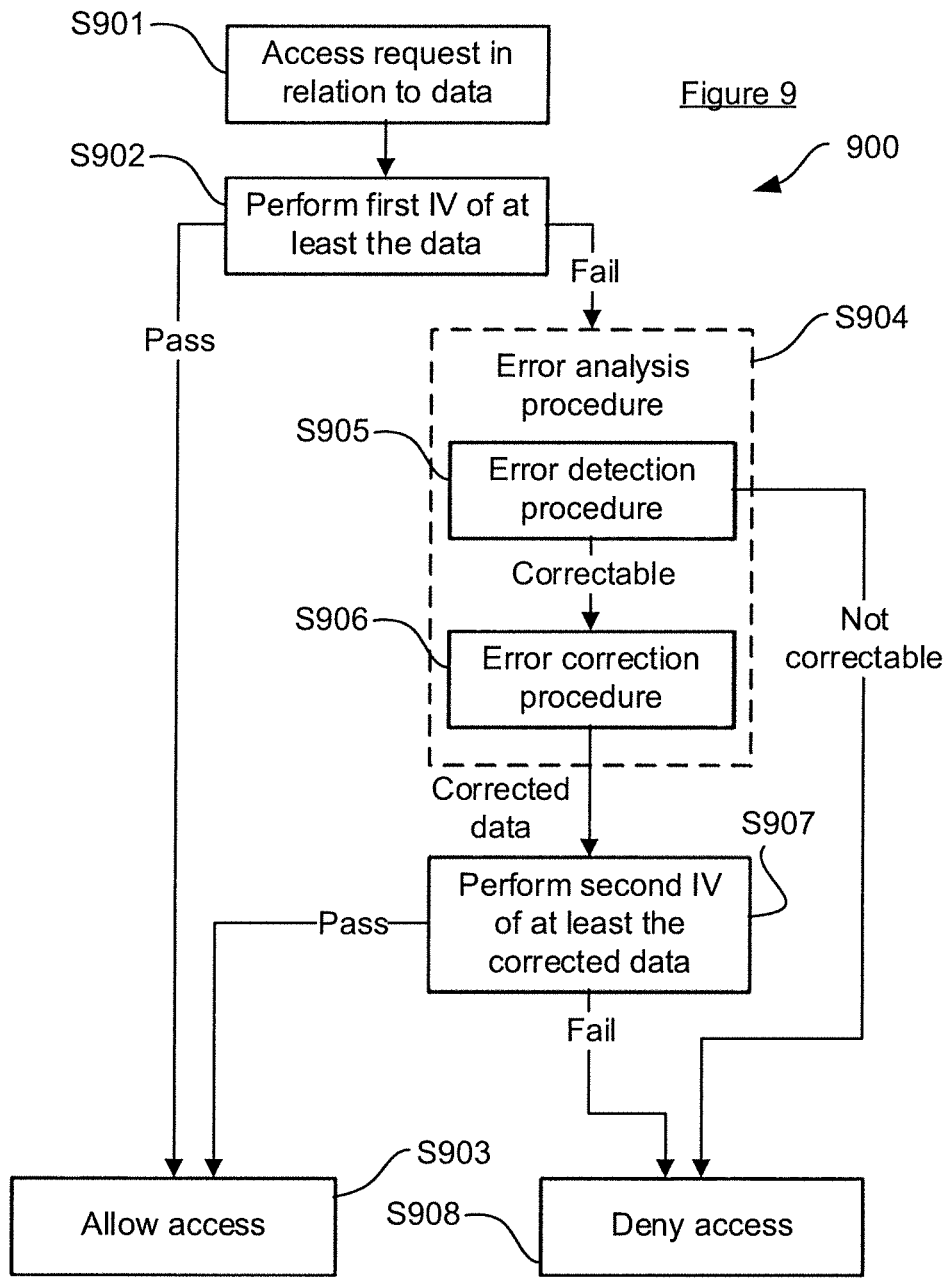
FIG. 9 schematically illustrates a computer-implemented method according to another embodiment.

Referring back to the general method 200 shown in FIG. 2, a more detailed version of this methodology, according to one embodiment, is shown in FIG. 9. The method 900 starts with an access request in relation to the data in step S901. Thus, step S901 in FIG. 9 is similar to step S201 in FIG. 2. The data in question may be the data 810 of the data structure of FIG. 8. As described previously, there exists ECC data relating to the data. In particular, the ECC data is generated by running an ECC encoding algorithm on the data. For example, the ECC data in question may be the ECC repair data 820 of FIG. 8. Advantageously, the ECC encoding algorithm may be run on one or more bytes of the data chunk in parallel (i.e. byte-wise data processing) for increased efficiency. The ECC encoding algorithm may be a Hamming-based algorithm (as described above) such that the ECC data comprises Hamming code parity bits relating to a combination of the data and the ECC data. However, other ECC encoding algorithms are also envisaged, such as Reed Solomon codes, turbo codes, Golay codes and the like.

Responsive to the access request, a first IV procedure is initiated at step S902 in relation to at least the data. Thus, step S902 in FIG. 9 is similar to step S202 in FIG. 2. The first IV procedure of step S902 may involve IV testing of only the data by processing of the embedded first IV data 814 of FIG. 8. For example, if the first IV data 814 is a hash value of the original file 812, then the first IV procedure may involve calculating and checking a hash value of the relevant data against the hash value stored as the first IV data 814. Alternatively/additionally, the first IV procedure of step S902 may involve IV testing of the data together with other data, e.g. by processing of the second IV data 830 of FIG. 8. For example, if the second IV data 830 is a digital signature of the rest of the data structure, then the first IV procedure may involve checking the validity of this digital signature. If the tested data passes the first IV procedure (i.e. if there is a finding of integrity of the tested data), then the access request is allowed in step S903. Alternatively, if the tested data fails the first IV procedure (i.e. if there is a finding of non-integrity of the tested data), then an error analysis procedure is instigated at step S904. Performing the error analysis procedure at step S904 in FIG. 9 is comparable to step S203 in FIG. 2.

The error analysis procedure of step S904 first comprises performing an error detection procedure at step S905. The error detection procedure is based on the ECC data (e.g. the ECC repair data 820 of FIG. 8). The error detection procedure is able to detect errors based on the ECC data. In a preferred embodiment, the error detection procedure is also able to generate data that can be used to speed up a subsequent error correction procedure. For example, in one implementation, an additional bit per Hamming parity stream may be (e.g. temporarily) stored so as to identify Hamming parity streams that include errors. Thus, these additional bits may together be considered to form an 'error map'. In the subsequent error correction phase, this error map can be used to eliminate repair attempts on Hamming parity streams that have already been identified as 'valid' (i.e. having no errors) during the error detection phase. The error map has a size equal to the span S (or a multiple of the span) and therefore also benefits from the span being a multiple of 8 bits performance-wise.

The error detection procedure is able to determine whether detected errors are correctable based on the ECC data. For example, in the case of Hamming-based error detection and correction, as discussed above, it is possible to correct errors so long as there is only a single error per Hamming parity stream. An error block of up to S bytes (where S is the span, as discussed above) may be corrected since each of the bit errors in the S bytes will be in a different Hamming parity stream. Errors longer than S bytes will not be correctable. If the error detection procedure determines that the detected errors are not correctable based on the ECC data, then the access request may be denied at step S908. Alternatively, if the error detection procedure determines that the detected errors are correctable based on the ECC data, then the method 900 continues to perform an error correction procedure at step S906. The error correction procedure is based on both the ECC data and the data chunk (i.e. both the data 810 and the ECC repair data 820 of FIG. 8). The error correction procedure may comprise running an ECC decoding algorithm that corresponds to the ECC encoding algorithm used to generate the ECC data. The error correction procedure thereby provides corrected data. If a read/write file system is being used, the corrected data may be written over the original data as appropriate so as to correct the data that is stored for access. In other words, the data (e.g. the data 810 in the data structure 800) may be updated (or repaired) using the corrected data. If a read only file system is being used, it is not possible to overwrite the original data with the corrected data, but the corrected data is returned in response to the original read request (i.e. the access request of step S901) in any case.

In practice, the error analysis procedure may comprise re-running the ECC encoding algorithm on the data (e.g. data 810) and comparing with the ECC data (e.g. ECC repair data 820). In other words, the ECC encoding algorithm that was used to generate the existing ECC data is re-run to generate a new set of ECC data for comparison to the existing ECC data (e.g. the ECC repair data 820). The differences between the new and existing ECC data enable the errors in the data to be detected and potentially corrected.

Whilst FIG. 9 depicts the error detection procedure and the error correction procedure as distinct/separate procedures, it will be understood that the error detection procedure and the error correction procedure may actually be non-separable parts of the same procedure. In some ECC schemes, there are not separate detection and correction steps at all. Instead, the data and the ECC data is just processed by a single procedure to generate corrected data in all cases. Thus, the error detection procedure is optional in that it is not always necessary to first detect the errors before correcting them.

Responsive to the error analysis procedure providing or generating corrected data, a second IV procedure is initiated at step S907 in relation to at least the corrected data. In other words, at least the corrected data is tested for integrity in the second IV procedure. Thus, step S907 of FIG. 9 is comparable to step S204 of FIG. 2. As previously mentioned, the second IV procedure of step S907 in relation to the corrected data is preferably the same as the first IV procedure of step S902 in relation to the original data. For example, the IV procedures of steps S902 and S907 may both comprise hash-based IV procedures based on stored IV data such as the first IV data 814 of FIG. 8. Alternatively/additionally, the IV procedures of steps S902 and S907 may both comprise digital signature IV based on other stored IV data such as the second IV data 830 of FIG. 8. However, different IV procedures may be used in steps S902 and S907 if desired.

If the corrected data passes the second IV procedure (i.e. if there is a finding of integrity of the corrected data), then the access request is allowed in step S903 using the corrected data. This is comparable to step S205 of FIG. 2. Alternatively, if the corrected data fails the IV procedure (i.e. if there is a finding of non-integrity of the corrected data), then the access request is denied in step S908.

Specific embodiments of the method of FIG. 2 have been described in this section. The next section sets out variations on this methodology in different circumstances. Various possible modifications are then discussed in the following section.

3—Variations

It will be appreciated that the data may be (or may form part of) a file stored in a non-volatile storage medium, such as a magnetic disc, a solid state memory, an EEPROM, etc.—thus, the access request may be, for example, a request to read the data from the storage medium. Alternatively, the data may be (or may form part of) an amount of data being stored in a volatile storage medium (e.g. a RAM), such as user space data (e.g. data generated by executing a user space application) and/or code space data (e.g. machine code or instructions of an application)—thus, the access request may be, for example, a request to read the data from the memory.

FIGS. 2 and 9 set out a computer-implemented method 200, 900 for self-checking and repair of data on receipt of an access request relating to that data. A related computer-implemented method for ongoing self-checking and repair of data is now described. The method is a computer-implemented method of securing data. The method comprises performing a series of checks. Performing a check comprises the following steps: (a) performing a first IV procedure to verify the integrity of at least the data; (b) responsive to a finding of non-integrity by the first IV procedure, performing an error analysis procedure based on the data and ECC data relating to the data; (c) responsive to generation of corrected data by the error analysis procedure, performing a second IV procedure to verify the integrity of at least the corrected data; and (d) responsive to a finding of integrity by the second IV procedure, updating the data using the corrected data. Such a method 1000 is illustrated schematically in FIG. 10.

The method 1000 comprises performing a series (or sequence) of checks (or tests) 1001. The checks may be performed periodically (e.g. the next check is performed after a predetermined period of time since the last check was started or finished) or in response to some event (e.g. an event triggered by an operating system of the computer or an event triggered by a process or application executing on the computer).

Figure 10:
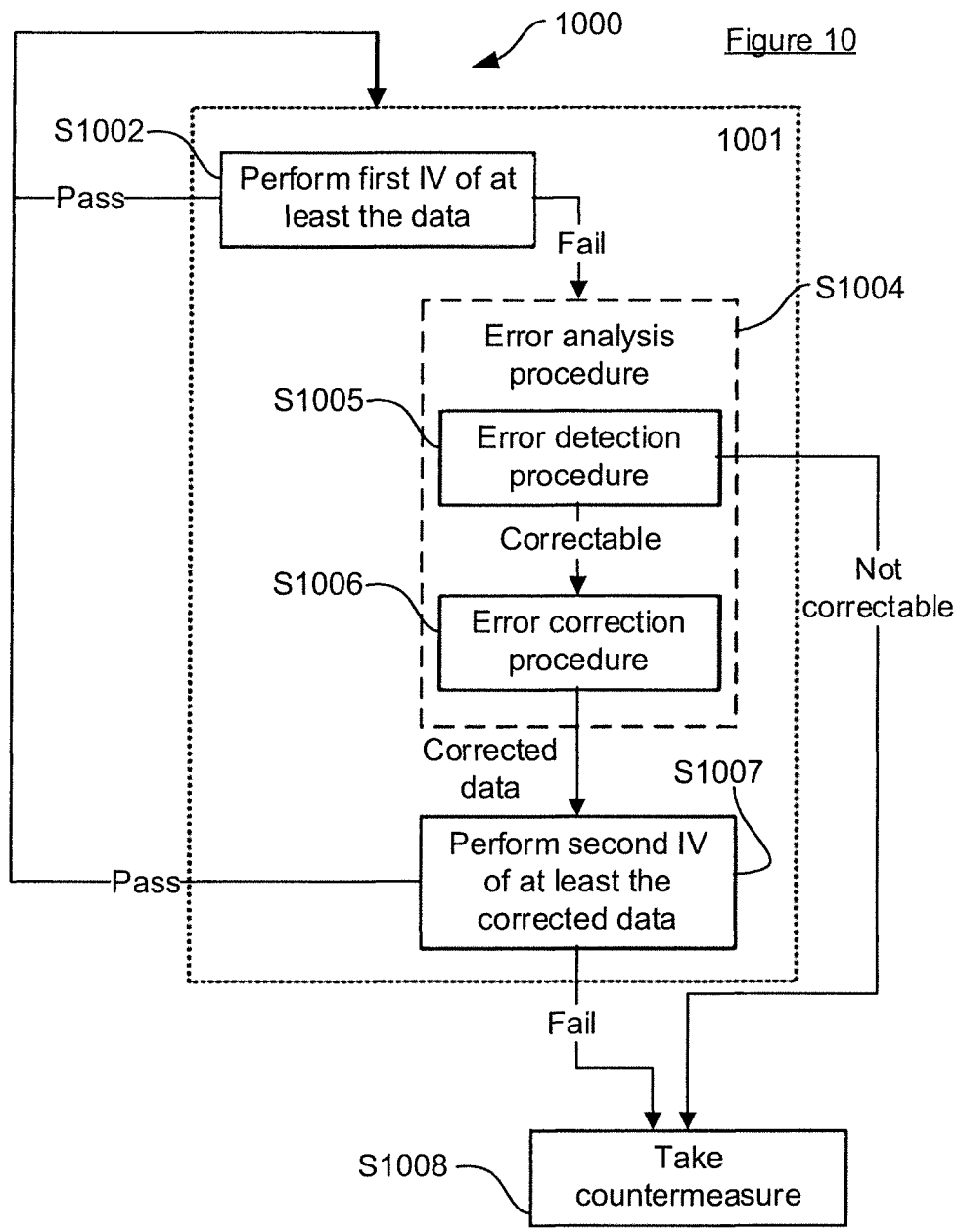
FIG. 10 schematically illustrates a computer-implemented method according to another embodiment.

A check 1001 starts with a step S1002 of performing a first IV procedure in relation to at least the data. The data may comprise data from one or more predetermined files stored in a non-volatile storage medium, such as a magnetic disc, a solid state memory, an EEPROM, etc. Additionally or alternatively, the data may comprise (or may form part of) an amount of data being stored in a volatile storage medium (e.g. a RAM), such as user space data (e.g. data generated by executing a user space application) and/or code space data (e.g. machine code or instructions of an application). Thus, the step S1002 in FIG. 10 is performed in the same way as the step S902 of FIG. 9. It shall, therefore, not be described in more detail herein.

If the tested data passes the first IV procedure (i.e. if there is a finding of integrity of the tested data), then the current check 1001 ends, and processing for the method 1000 will resume with performance of the next check 1001 of the sequence of checks 1001.

Alternatively, if the tested data fails the first IV procedure (i.e. if there is a finding of non-integrity of the tested data), then an error analysis procedure is instigated at step S1004. The step S1004 in FIG. 10 is performed in the same way as the step S904 of FIG. 9.

In a similar manner to the discussion of FIG. 9, the error analysis procedure of step S1004 first comprises performing an error detection procedure at step S1005. The error detection procedure is based on the ECC data (e.g. the ECC repair data 820 of FIG. 8). The error detection procedure is able to detect errors based on the ECC data. In a preferred embodiment, the error detection procedure is also able to generate data that can be used to speed up a subsequent error correction procedure. For example, in one implementation, an additional bit per Hamming parity stream may be (e.g. temporarily) stored so as to identify Hamming parity streams that include errors. Thus, these additional bits may together be considered to form an 'error map'. In the subsequent error correction phase, this error map can be used to eliminate repair attempts on Hamming parity streams that have already been identified as 'valid' (i.e. having no errors) during the error detection phase. The error map has a size equal to the span S (or a multiple of the span) and therefore also benefits from the span being a multiple of 8 bits performance-wise.

The error detection procedure is able to determine whether detected errors are correctable based on the ECC data. For example, in the case of Hamming-based error detection and correction, as discussed above, it is possible to correct errors so long as there is only a single error per Hamming parity stream. An error block of up to S bytes (where S is the span, as discussed above) may be corrected since each of the bit errors in the S bytes will be in a different Hamming parity stream. Errors longer than S bytes will not be correctable. If the error detection procedure determines that the detected errors are not correctable based on the ECC data, then processing continues at a step S1008 (described in more detail later). Alternatively, if the error detection procedure determines that the detected errors are correctable based on the ECC data, then the check 1001 continues to perform an error correction procedure at step S1006. The error correction procedure is based on both the ECC data and the data chunk (i.e. both the data 810 and the ECC repair data 820 of FIG. 8). The error correction procedure may comprise running an ECC decoding algorithm that corresponds to the ECC encoding algorithm used to generate the ECC data. The error correction procedure thereby provides corrected data.

In practice, the error analysis procedure may comprise re-running the ECC encoding algorithm on the data (e.g. data 810) and comparing with the ECC data (e.g. ECC repair data 820). In other words, the ECC encoding algorithm that was used to generate the existing ECC data is re-run to generate a new set of ECC data for comparison to the existing ECC data (e.g. the ECC repair data 820). The differences between the new and existing ECC data enable the errors in the data to be detected and potentially corrected.

Whilst FIG. 10 depicts the error detection procedure and the error correction procedure as distinct/separate procedures, it will be understood that the error detection procedure and the error correction procedure may actually be non-separable parts of the same procedure. In some ECC schemes, there are not separate detection and correction steps at all.

Instead, the data and the ECC data is just processed by a single procedure to generate corrected data in all cases. Thus, the error detection procedure is optional in that it is not always necessary to first detect the errors before correcting them.

Responsive to the error analysis procedure providing or generating corrected data, a second IV procedure is initiated at step S1007 in relation to at least the corrected data. In other words, at least the corrected data is tested for integrity in the second IV procedure. The step S1007 in FIG. 10 is performed in the same way as the step S907 of FIG. 9. The second IV procedure of step S1007 in relation to the corrected data is preferably the same as the first IV procedure of step S1002 in relation to the original data. For example, the IV procedures of steps S1002 and S1007 may both comprise hash-based IV procedures based on stored IV data such as the first IV data 814 of FIG. 8. Alternatively/additionally, the IV procedures of steps S1002 and S1007 may both comprise digital signature IV based on other stored IV data such as the second IV data 830 of FIG. 8. However, different IV procedures may be used in steps S1002 and S1007 if desired.

If the corrected data passes the second IV procedure (i.e. if there is a finding of integrity of the corrected data), then the original data is updated (e.g. overwritten) using the corrected data—i.e. the corrupted original data is restored to its original form. The processing for the method 1000 then resumes with performance of the next check 1001 of the sequence of checks 1001. Alternatively, if the corrected data fails the IV procedure (i.e. if there is a finding of non-integrity of the corrected data), then processing continues at a step S1008.

At the step S1008, the method 1000 may carry out a variety of operations. This step S1008 is reached when the data being checked has been found to be corrupted in an uncorrectable manner, e.g. if an attacker has made too many modifications to the data to be correctable. In some embodiments, the step S1008 may involve replacing the data that was being checked with alternative data (e.g. randomly generated data)—this would help thwart an attacker's attack. Additionally or alternatively, in some embodiments, the step S1008 may involve causing one or more applications or processes (e.g. applications or processes that are based on, or that use, the data that was being checked) to terminate. Additionally or alternatively, in some embodiments, the step S1008 may involve logging the fact that the step S1008 has been reached (i.e. that uncorrectable corrupted data has been identified) and/or alerting a user of the computer or some other entity to the fact that the step S1008 has been reached. It will be appreciated that other countermeasures could be taken at the step S1008. Processing may then resume with carrying out the next check 1001 of the series of checks 1001 (although this may not happen if, for example, an application or process has been terminated).

In this way, for example, if an attacker attempts to carry out an attack by modifying code and/or data for an application or process, then the method 1000 enables on-going checking and repair of that code and/or data, which can help thwart the attack since the attacker's modifications may be undone (potentially without the attacker even aware that this has happened).

In one embodiment, the data comprises one of more instructions in code space of an executing application and/or data generated by the executing application. In this embodiment, the series of checks is performed at runtime of the executing application.

Two related methods are contemplated at load time of a computer program. Thus, the data comprises at least part of a computer program. Two methods of executing, using one or more processors, a computer program stored on a storage medium are now described.

The first such method comprises loading into code space at least part of the computer program stored on the storage medium. The first method further comprises executing one or more instructions of the loaded at least part of the computer program. Execution of said one or more instructions causes the one or more processors to: (a) perform a first IV procedure to verify the integrity of the loaded at least part of the computer program; (b) responsive to a finding of non-integrity by the first IV procedure, perform an error analysis procedure based on the loaded at least part of the computer program and corresponding ECC data; (c) responsive to generation of corrected data by the error analysis procedure, perform a second IV procedure to verify the integrity of at least the corrected data; (d) responsive to a finding of integrity by the second IV procedure, update the computer program stored on the storage medium using the corrected data; and (e) cause execution of the computer program to terminate.

Thus, in this first method, there is verification of the version of the computer program that has been loaded into code space. Alternatively, it is envisaged that there could be verification of the version of the computer program stored on the storage medium, as per the second method set out below.

The second method comprises loading into code space at least part of the computer program stored on the storage medium. The second method further comprises executing one or more instructions of the loaded at least part of the computer program. Execution of said one or more instructions causes the one or more processors to: (a) perform a first IV procedure to verify the integrity of the computer program stored on the storage medium; (b) responsive to a finding of non-integrity by the first IV procedure, perform an error analysis procedure based on the computer program stored on the storage medium and corresponding ECC data; (c) responsive to generation of corrected data by the error analysis procedure, perform a second IV procedure to verify the integrity of at least the corrected data; (d) responsive to a finding of integrity by the second IV procedure, update the computer program stored on the storage medium using the corrected data; and (e) cause execution of the computer program to terminate.

Figure 11:
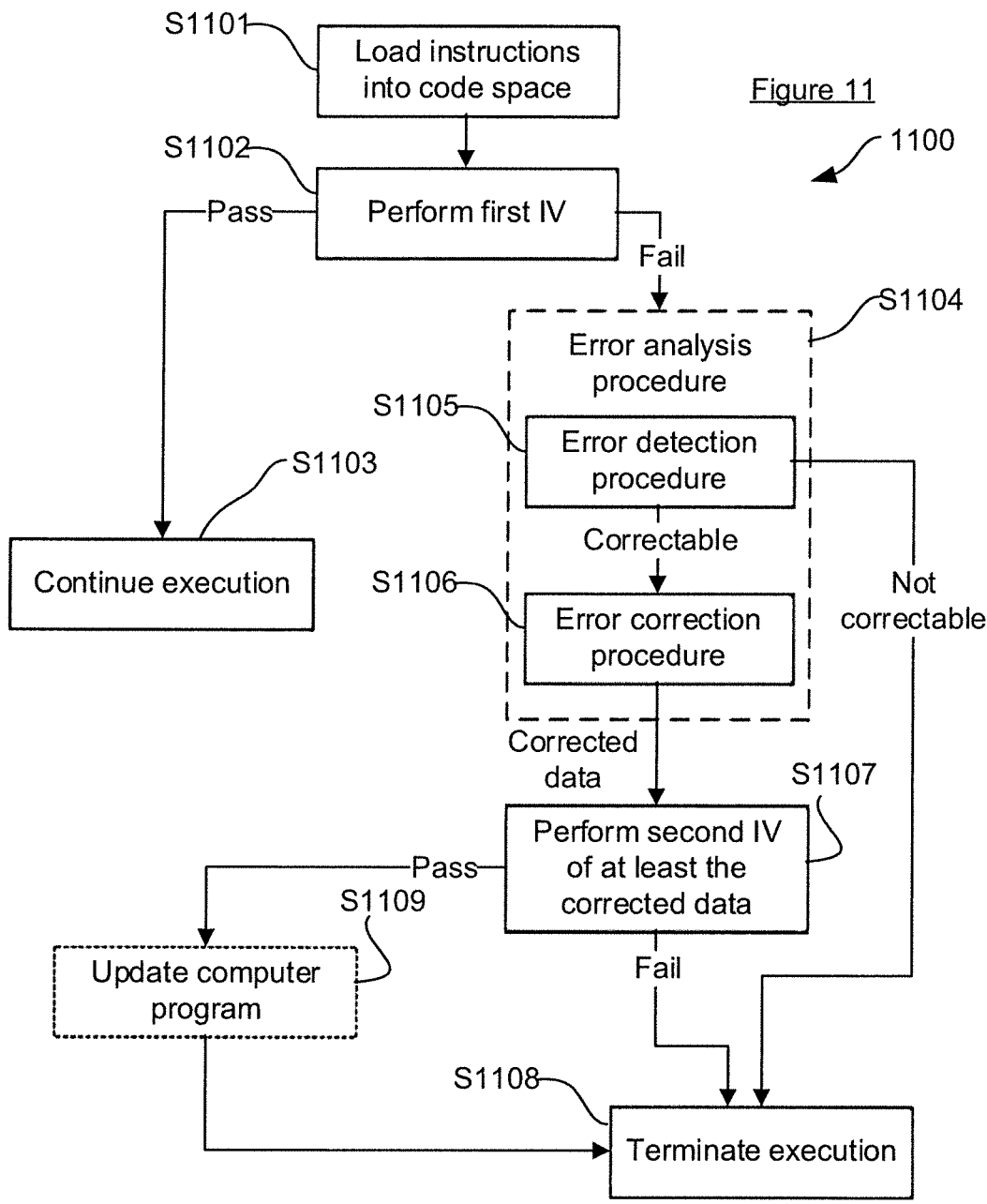
FIG. 11 schematically illustrates a computer-implemented method according to another embodiment.

FIG. 11 is a flow chart illustrating the above two example methods. The method 1100 starts with step S1101 at which at least part of a computer program that is being stored in a storage medium (e.g. a magnetic disc or solid state storage) is loaded into memory (e.g. RAM)—i.e. at least part of the computer program is loaded into code space of the computer's memory. For example, one or more instructions of the computer program (which may be all of the instructions of the computer program, but not necessarily all of them depending on the nature of the computer program and how the computer program is loaded) are loaded into code space for execution by the computer. Loading of computer program instructions into code space is well-known and therefore shall not be described in more detail herein.

Execution of the loaded instructions may then commence. One or more of the loaded instructions then cause the one or more processors of the computer to carry out the subsequent steps of the method 1100.

At a step S1102, a first IV procedure is carried out in relation to an amount of data. In some embodiments, this data comprises the computer program (or at least part of the computer program) as stored on the storage medium. Additionally or alternatively, this data comprises the loaded part of the computer program (or at least part of the loaded part of the computer program). Thus, the step S1102 in FIG. 11 is performed in the same way as the step S902 of FIG. 9 and the step S1002 of FIG. 10. It shall, therefore, not be described in more detail herein.

If the tested data passes the first IV procedure (i.e. if there is a finding of integrity of the tested data), then execution of the computer program may continue, as show at step S1103.

Alternatively, if the tested data fails the first IV procedure (i.e. if there is a finding of non-integrity of the tested data), then an error analysis procedure is instigated at step S1104. The step S1104 in FIG. 11 is performed in the same way as the step S904 of FIG. 9 and the step S1004 of FIG. 10.

In a similar manner to the discussion of FIGS. 9 and 10, the error analysis procedure of step S1104 first comprises performing an error detection procedure at step S1105. The error detection procedure is based on the ECC data (e.g. the ECC repair data 820 of FIG. 8). The error detection procedure is able to detect errors based on the ECC data. In a preferred embodiment, the error detection procedure is also able to generate data that can be used to speed up a subsequent error correction procedure. For example, in one implementation, an additional bit per Hamming parity stream may be (e.g. temporarily) stored so as to identify Hamming parity streams that include errors. Thus, these additional bits may together be considered to form an 'error map'. In the subsequent error correction phase, this error map can be used to eliminate repair attempts on Hamming parity streams that have already been identified as 'valid' (i.e. having no errors) during the error detection phase. The error map has a size equal to the span S (or a multiple of the span) and therefore also benefits from the span being a multiple of 8 bits performance-wise.

The error detection procedure is able to determine whether detected errors are correctable based on the ECC data. For example, in the case of Hamming-based error detection and correction, as discussed above, it is possible to correct errors so long as there is only a single error per Hamming parity stream. An error block of up to S bytes (where S is the span, as discussed above) may be corrected since each of the bit errors in the S bytes will be in a different Hamming parity stream. Errors longer than S bytes will not be correctable. If the error detection procedure determines that the detected errors are not correctable based on the ECC data, then processing continues at a step S1108 (described in more detail later). Alternatively, if the error detection procedure determines that the detected errors are correctable based on the ECC data, then an error correction procedure is performed at step S1106. The error correction procedure is based on both the ECC data and the data chunk (i.e. both the data 810 and the ECC repair data 820 of FIG. 8). The error correction procedure may comprise running an ECC decoding algorithm that corresponds to the ECC encoding algorithm used to generate the ECC data. The error correction procedure thereby provides corrected data.

In practice, the error analysis procedure may comprise re-running the ECC encoding algorithm on the data (e.g. data 810) and comparing with the ECC data (e.g. ECC repair data 820). In other words, the ECC encoding algorithm that was used to generate the existing ECC data is re-run to generate a new set of ECC data for comparison to the existing ECC data (e.g. the ECC repair data 820). The differences between the new and existing ECC data enable the errors in the data to be detected and potentially corrected.

Whilst FIG. 11 depicts the error detection procedure and the error correction procedure as distinct/separate procedures, it will be understood that the error detection procedure and the error correction procedure may actually be non-separable parts of the same procedure. In some ECC schemes, there are not separate detection and correction steps at all. Instead, the data and the ECC data is just processed by a single procedure to generate corrected data in all cases. Thus, the error detection procedure is optional in that it is not always necessary to first detect the errors before correcting them.

Responsive to the error analysis procedure providing or generating corrected data, a second IV procedure is initiated at step S1107 in relation to at least the corrected data. In other words, at least the corrected data is tested for integrity in the second IV procedure. The step S1107 in FIG. 11 is performed in the same way as the step S907 of FIG. 9 and the step S1107 of FIG. 10. The second IV procedure of step S1107 in relation to the corrected data is preferably the same as the first IV procedure of step S1102 in relation to the original data. For example, the IV procedures of steps S1102 and S1107 may both comprise hash-based IV procedures based on stored IV data such as the first IV data 814 of FIG. 8. Alternatively/additionally, the IV procedures of steps S1102 and S1107 may both comprise digital signature IV based on other stored IV data such as the second IV data 830 of FIG. 8. However, different IV procedures may be used in steps S1102 and S1107 if desired.

If the corrected data passes the second IV procedure (i.e. if there is a finding of integrity of the corrected data), then:
- If the data checked at the step S1102 comprises the computer program (or at least part of the computer program) as stored on the storage medium, then processing continues at a step S1109 at which the computer program stored on the storage medium is updated (e.g. overwritten) using the corrected data—i.e. the corrupted computer program stored on the storage medium is restored to its original form. Processing then continues at a step S1108.
- If the data checked at the step S1102 does not comprise the computer program (or at least part of the computer program) as stored on the storage medium, but only comprises the loaded part of the computer program (or at least part of the loaded part of the computer program), then the step S1109 may be carried out (as described above) or may be omitted (with processing continuing at the step S1108 instead).

Alternatively, if the corrected data fails the IV procedure (i.e. if there is a finding of non-integrity of the corrected data), then processing continues at the step S1108.

At the step S1108, execution of the computer program is terminated. It will be appreciated that additional operations may be carried out at the step S1108. For example, in some embodiments, the step S1108 may involve logging the fact that the step S1108 has been reached (i.e. that uncorrectable corrupted data has been identified) and/or alerting a user of the computer or some other entity to the fact that the step S1108 has been reached.

In this way, for example, if an attacker attempts to execute a corrupted computer program (be that a computer program stored in corrupted form on a storage medium or a computer program that is uncorrupted on the storage medium but that gets corrupted when it is loaded into code space), then the method 1100 enables the computer program to self-check and terminate. The instructions for carrying out the steps S1102, S1104, S1105, S1106, S1107, S1108 and S1109 may, of course, be implemented in an obfuscated manner (as is known in this field of technology) to help prevent an attacker from circumventing the checking mechanism of the method 1100.

It will be appreciated that, if the step S1103 is reached, at which execution of the computer program is permitted to continue after the computer program has be loaded, the method 1000 of FIG. 10 may be used to carry out on-going monitoring of the code of and/or data of the executing computer program.

4—Modifications

The above embodiments relate to Hamming codes being used for the ECC encoding and decoding algorithms. As previously mentioned, any ECC algorithm could theoretically be used, (e.g. Reed Solomon codes, turbo codes, Golay codes and the like). Golay codes are more robust than Hamming codes, and Turbo codes are more robust again. However, this extra robustness comes at a computational overhead. For example, Golay codes are performed with [data-bits, error-bits] of [24, 12] or [24,11], which equates to an overhead of 50% or 52%. Similarly, turbo codes are feedback ECCs that require a far more complex algorithm to implement. Even with code puncturing (a sub-method to eliminate certain error bits to reduce overhead), the overhead would remain high and the complexity to implement would increase. Thus, Hamming codes generally represent the preferred implementation. In Hamming codes, the Hamming repair bits are logically placed at 'powers of 2' locations, as described above with respect to FIG. 3. There are highly optimized mathematical 'tricks' that use standard machine code implementation to take advantage of numbers that are powers of 2 (i.e. a number x is a power of 2 if (x XOR (x−1))==0). Thus Hamming ECC algorithms generally have a low overhead and low complexity compared to alternative ECC algorithms.

It will be appreciated that the methods 900, 1000 and 1100 represents specific embodiments. In alternative embodiments, an attempt may be made to correct the data regardless of whether the data is correctable or not. In other words, the error correction procedure may run regardless of the result of the error detection procedure. In such an embodiment, it would be particularly efficient to combine the error detection and error correction procedures into a single procedure. Also, in such an embodiment, it is notable that any repair is destructive of an attacker's aims, whether that repair is successful or not. Whilst the error correction procedure would not be able to correctly repair the data if the errors are too numerous (e.g. if there is more than one error per Hamming parity stream), attempting to correct the data would nonetheless thwart an attacker's modifications to the data, thereby rendering the attack less effective.

In further alternative embodiments, the access request in the method 200 and 900 may always be allowed, regardless of whether IV has succeeded. When IV fails, instead of denying the access request, an alert may be issued or an error may be logged for future handling. In such an embodiment, an attacker would not necessarily become immediately aware that their attack had not been successful. This is in contrast to the case where an attacker would be denied access to the data if the IV failed, and would therefore be aware that their modifications had been noticed.

A further embodiment of the method 200 or 900 is contemplated, whereby a portion of the data is intentionally/deliberately damaged (i.e. tampered with) prior to receiving the access request in step S201 or S901. The damage may be effected by replacing the selected portion of the data with another (e.g. random) portion of data of a similar size. The damage means that the first integrity verification procedure will result in a finding of non-integrity.

However, the damage is such that the error analysis procedure is able to correct data errors resulting from the damage. The location and extent of the damage will therefore depend on the ECC data: it is important that any damage is correctable by means of the associated ECC data. For example, the damage may relate to a single multiple-bit error spanning up to the predetermined number of consecutive bits of the data (as such an error is correctable using the ECC data). Alternatively, the damage may relate to a number of smaller bit errors. After performing the method 200 or 900 on the damaged data, the original (undamaged) data may be recovered (assuming, of course, that there are no uncorrectable errors resulting from other (unintentional) damage to the data). Prior to the damaging step, this embodiment may also comprise, selecting the portion of the data to be damaged. A user may select the portion of the data to be damaged based on frequency of data access and/or perceived importance of data, or randomly, and/or in any other way. The data selected for tampering could be in only one repair block, or more, up to all repair blocks. To further obfuscate the tampering, the tampered bits do not need to be consecutive/contiguous within the data. As discussed previously, to enable repair, the requirement is that only one bit is tampered with per Hamming parity stream.

In this embodiment, the intentional damage means that the original (undamaged) data will not be accessible without using the integrity verification and error detection/correction procedures of the present invention. Thus, if the data is moved to another device which does not run the method 200 or 900, then the data will remain damaged and will potentially be unusable). In contrast, any data access request on device(s) which do run the method 200 or 900 will be unaffected, since the damage will be corrected before providing the requested data. In this way it is possible to tie data to one or more particular devices which run the method 200 or 900 in relation to access requests.

In this embodiment, it is preferable that the tampered data is read-only data (e.g. in a read-only segment of the data). This prevents the ECC analysis procedure from potentially overwriting the tampered data with the corrected data. Whilst this overwriting would be desirable for correcting accidental data errors, it would be undesirable in relation to intentionally tampered data as it would negate the protection provided. Alternatively, if the tampered data is in a read-write segment of the data (so is not read only), a means of identifying tampered sections of the data could be provided such that the method could be implemented so as to avoid overwriting those identified tampered sections of data. This would ensure that the protection provided by the tampering is retained.

This intentional tampering embodiment is particularly useful in terms of data comprising an executable. In such a case, a damaged executable will not run (or will not perform as intended/expected) unless it can first be corrected. Thus, it is necessary to perform the method 200 or 900 to correct the executable prior to running the executable. Again, this means that the executable will not run correctly on an unsanctioned device which does not include a suitable loader that runs the method 200 or 900.

Hence, a similar embodiment is envisaged in terms of the method 1100 at load time of a computer program (executable). In this embodiment, prior to the loading step, a portion of the computer program stored on the storage medium is intentionally/deliberately damaged/tampered with. The damage is such that the error analysis procedure is able to correct errors resulting from the damage. Thus, the damaged computer program will only function reliably when it is run in conjunction with the method 1100. In this embodiment, when selecting a portion of the computer program to be damaged, it is preferable to select a portion on which the program relies for proper functioning (e.g. part of the main code, or an important subroutine, rather than selecting coding comments or rarely used subroutines). In one example of consecutive-bit tampering (i.e. a contiguous tamper), a code branch could be tampered with in such a way that it jumps to a complex function which actually does nothing. Only after the ECC analysis procedure of the method 1100 is a corrected version of the code able to be accessed.

In further embodiments, additional steps may be included in relation to the use of the ECC repair trailer 822. As described above, the optional ECC repair trailer 822 may include additional repair data to repair the ECC repair trailer 822 itself. Therefore, the method 900 may further comprise a second error analysis procedure. Whereas the error analysis procedure of step S904 is based on the data and the ECC data, the second error analysis procedure would be based on the ECC repair trailer 822, including the additional ECC repair data. The second error analysis procedure may comprise performing a second error detection procedure based on the additional ECC repair data so as to determine whether detected errors are correctable based on the additional ECC repair data. The second error analysis procedure may comprise performing a second error correction procedure based on the ECC repair trailer 822, including the additional ECC repair data, so as to provide a corrected ECC repair trailer 822. Thus, the additional ECC repair data may be used to detect errors in the ECC repair trailer 822. The additional ECC repair data may also be used to attempt to correct the detected errors so as to provide a corrected ECC repair trailer 822.

In some embodiments, the method 200, 900 or 1000 may be carried out by the kernel of the system 100, e.g. by a kernel module executed in kernel space. For example, when the kernel receives a request/command to access a file being stored on a storage medium or to access an area of memory, then the kernel (or the kernel module) may carry out the method of 200, 900 or 1000 in relation to that file or that area of memory (as the data). Alternatively, the method 200, 900 or 1000 may be carried out by a user-space module into which the kernel (or a kernel module) hooks. For example, when the kernel receives a request/command to access a file being stored on a storage medium or to access an area of memory, then the kernel (or the kernel module) may issue a command/instruction to the user-space module to cause the user-space module to carry out the method 200, 900 or 1000 in relation to that file or that area of memory (as the data). The user-space module may be implemented in an obfuscated manner to help prevent an attacker from being able to modify the functionality of the user-space module. To avoid relying on bespoke kernel modules, or having kernel modules hook into user-space modules, the method 1100 may be used (in which a computer program executing in user-space may carry out its own checking and correction). Likewise, it will be appreciated that the methods 200, 900 and 1000 may equally be carried out as part of execution of a computer program in user-space.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A computer-implemented method comprising:
receiving an access request in relation to data, wherein there exists Error Correcting Code (ECC) data relating to the data, wherein the ECC data is generated by running an ECC encoding algorithm on the data, wherein the ECC encoding algorithm is a Hamming-based algorithm such that the ECC data comprises Hamming parity bits relating to a combination of the data and the ECC data, and wherein the ECC data is configured to enable correction of multiple-bit errors spanning up to a predetermined number of consecutive bits of the data;
performing a first integrity verification procedure to verify an integrity of at least the data;
responsive to a finding of non-integrity by the first integrity verification procedure, performing an error analysis procedure based on the data and the ECC data;
responsive to generation of corrected data by the error analysis procedure, performing a second integrity verification procedure to verify the integrity of at least the corrected data;
wherein performing the first integrity verification procedure has a lower computational overhead than performing the error analysis procedure, and wherein the first and/or the second integrity verification procedures are not ECC-based integrity verification procedures; and
responsive to a finding of integrity by the second integrity verification procedure, allowing the access request using the corrected data;
wherein the ECC data is generated such that a multiple-bit error spanning the predetermined number of consecutive bits would cause a maximum of one error per Hamming parity stream, thereby enabling correction of the multiple-bit error.

2. The method of claim 1, wherein the predetermined number of consecutive bits is equivalent to an integer number of bytes.

3. The method of claim 1, further comprising: damaging a portion of the data prior to receiving the access request, the damage being such that the first integrity verification procedure will result in a finding of non-integrity, and the damage being such that the error analysis procedure is able to correct errors in the portion of the data resulting from the damage.

4. The method of claim 1:
wherein the error analysis procedure comprises performing an error correction procedure based on both the ECC data and the data so as to provide the corrected data;
wherein the error analysis procedure comprises performing an error detection procedure based on the ECC data so as to determine whether detected errors are correctable based on the ECC data;
wherein the error correction procedure is performed responsive to a determination from the error detection procedure that the detected errors are correctable based on the ECC data; and responsive to a determination from the error detection procedure that the detected errors are not correctable based on the ECC data, denying the access request.

5. The method of claim 1, further comprising:
responsive to generation of corrected data by the error analysis procedure, updating the data using the corrected data.

6. The method of claim 1, further comprising:
responsive to a finding of integrity by the first integrity verification procedure, allowing the access request; and
responsive to a finding of non-integrity by the second integrity verification procedure, denying the access request.

7. The method of claim 1, wherein the error analysis procedure comprises:
re-running the ECC encoding algorithm on the data to generate comparative ECC data;
comparing the comparative ECC data with the ECC data; and
running an ECC decoding algorithm based on the data and the ECC data so as to generate the corrected data.

8. The method of claim 1, wherein the ECC encoding algorithm is run on one or more bytes of the data in parallel.

9. The method of claim 7, wherein the ECC decoding algorithm is run on one or more bytes of the data in parallel.

10. The method of claim 1, wherein the data comprises executable software code.

11. The method of claim 1, wherein the data verified in the first and/or second verification procedures comprises one of:
the data; and
the data and the ECC data.

12. The method of claim 1, wherein the first integrity verification procedure is the same as the second integrity verification procedure.

13. The method of claim 1, wherein the first and/or second integrity verification procedures use one or more of a hash value, a checksum, a message authentication code, and a digital signature.

14. The method of claim 1:
wherein the data comprises a first integrity verification data for use in the first and/or second integrity verification procedures; and
wherein a second integrity verification data is stored with the data for use in the first and/or second integrity verification procedures.

15. An apparatus comprising one or more processors arranged to carry out a method comprising:
receiving an access request in relation to data, wherein there exists Error Correcting Code (ECC) data relating to the data, wherein the ECC data is generated by running an ECC encoding algorithm on the data, wherein the ECC encoding algorithm is a Hamming-based algorithm such that the ECC data comprises Hamming parity bits relating to a combination of the data and the ECC data, and wherein the ECC data is configured to enable correction of multiple-bit errors spanning up to a predetermined number of consecutive bits of the data;
performing a first integrity verification procedure to verify the integrity of at least the data;
responsive to a finding of non-integrity by the first integrity verification procedure, performing an error analysis procedure based on the data and the ECC data;
responsive to generation of corrected data by the error analysis procedure, performing a second integrity verification procedure to verify the integrity of at least the corrected data;

wherein performing the first integrity verification procedure has a lower computational overhead than performing the error analysis procedure, and wherein the first and/or the second integrity verification procedures are not ECC-based integrity verification procedures; and responsive to a finding of integrity by the second integrity verification procedure, allowing the access request using the corrected data;

wherein the ECC data is generated such that a multiple-bit error spanning the predetermined number of consecutive bits would cause a maximum of one error per Hamming parity stream, thereby enabling correction of the multiple-bit error.

16. One or more non-transitory computer readable media comprising computer program code which, when executed by one or more processors, causes the one or more processors to carry out a method comprising:

receiving an access request in relation to data, wherein there exists Error Correcting Code (ECC) data relating to the data, wherein the ECC data is generated by running an ECC encoding algorithm on the data, wherein the ECC encoding algorithm is a Hamming-based algorithm such that the ECC data comprises Hamming parity bits relating to a combination of the data and the ECC data, and wherein the ECC data is configured to enable correction of multiple-bit errors spanning up to a predetermined number of consecutive bits of the data;

performing a first integrity verification procedure to verify the integrity of at least the data;

responsive to a finding of non-integrity by the first integrity verification procedure, performing an error analysis procedure based on the data and the ECC data;

responsive to generation of corrected data by the error analysis procedure, performing a second integrity verification procedure to verify the integrity of at least the corrected data; wherein performing the first integrity verification procedure has a lower computational overhead than performing the error analysis procedure; and wherein the first and/or the second integrity verification procedures are not ECC-based integrity verification procedures; and responsive to a finding of integrity by the second integrity verification procedure, allowing the access request using the corrected data;

wherein the ECC data is generated such that a multiple-bit error spanning the predetermined number of consecutive bits would cause a maximum of one error per Hamming parity stream, thereby enabling correction of the multiple-bit error.

* * * * *